United States Patent
Playle et al.

(10) Patent No.: US 11,703,885 B2
(45) Date of Patent: Jul. 18, 2023

(54) METHOD AND SYSTEM FOR BODE PLOT INFORMATION COLLECTION FOR HOVERING/FIXED-WING UNMANNED AERIAL VEHICLES (UAVS)

(71) Applicant: MicroPilot Inc., Stony Mountain (CA)

(72) Inventors: Nicholas Andrew Playle, Winnipeg (CA); Maziar Mardan, Winnipeg (CA); Tyler Desmond Melmoth, Winnipeg (CA); Howard William Loewen, Winnipeg (CA)

(73) Assignee: 4596286 Manitoba Inc., Winnipeg (CA)

( * ) Notice: Subject to any disclaimer, the term of this patent is extended or adjusted under 35 U.S.C. 154(b) by 1300 days.

(21) Appl. No.: 16/124,667

(22) Filed: Sep. 7, 2018

(65) Prior Publication Data

US 2023/0176590 A1    Jun. 8, 2023

Related U.S. Application Data

(60) Provisional application No. 62/557,337, filed on Sep. 12, 2017.

(51) Int. Cl.
*G05B 13/04* (2006.01)
*G05D 1/08* (2006.01)

(52) U.S. Cl.
CPC ......... *G05D 1/0825* (2013.01); *G05B 13/042* (2013.01)

(58) Field of Classification Search
CPC .............................. G05D 1/0825; G05B 13/042
See application file for complete search history.

(56) References Cited

PUBLICATIONS

Dorobontu, Test Platforms for Model-Based Flight Research, Sep. 2013 (Year: 2022).*
Rothman, Validation of Linearized Flight Models Using Automated System-Identification, May 2005 (Year: 2022).*
Niermeyer et al., Open-Loop Quadrotor Flight Dynamics Identification in Frequency Domain via Closed-Loop Flight Testing, Jan. 2015 (Year: 2022).*
Mettler et al., System Identification of Small-Size Unmanned Helicopter Dynamics, 1999 (Year: 2022).*
Miller, Derek Scott; "Open Loop System Identification of a Micro Quadrotor Helicopter from Closed Loop Data" Master of Science Thesis; 2011; 157 pages.

(Continued)

*Primary Examiner* — Anne Marie Antonucci
*Assistant Examiner* — Jared C Bean
(74) *Attorney, Agent, or Firm* — Miltons IP/p.i.

(57) ABSTRACT

A method for collecting information required for Bode plot creation of a UAV (Unmanned Aerial Vehicle) autopilot system is provided. The method comprises: creating a Bode plot generation input signal: adding the Bode plot generation input signal to control inputs; collecting data from multiple points within the control system; calculating magnitude and phase at the multiple points using the data collected; recording the magnitude and phase for the multiple points in a datalog; comparing the magnitude and phase for the multiple points to calculate the gain and phase margins for open loop responses in the control system; creating a Bode plot for at least one of the following: i) a closed loop response of the attitude and/or rate loops, ii) an open loop response of the attitude and/or rate loops and iii) a response of the UAV; and outputting the Bode plot.

20 Claims, 13 Drawing Sheets

(56) References Cited

PUBLICATIONS

Mansur, Mohammadreza H. et al.; "Full Flight Envelope Inner-Loop Control Law Development for the Unmanned K-MAX" Virginia Beach, VA; May 3-5, 2011; 17 pages.

Mohajerani, Mohammadhossein; "Frequency-Domain System Identification for Unmanned Helicopters from Flight Data"; Master of Applied Sciences Thesis; 2014; 103 pages.

Rothman, Keith Eric; "Validation of Linearized Flight Models Using Automated System-Identification"; Master of Science Thesis; May 2009; 125 pages.

Atkins, Ella et al.; "Unmanned Aircraft Systems"; Encyclopedia of Aerospace Engineering; 2016; pp. 254, 256.

Niermeyer, Philipp et al.; "Open-Loop Quadrotor Flight Dynamics Identification in Frequency Domain via Closed-Loop Flight Testing"; the American Institute of Aeronautics and Astronautics, Inc.; 2015; 14 pages.

Dorobantu, Andrei; "Test Platforms for Model-Based Flight Research"; Dissertation for Doctor of Philosophy; Sep. 2013; 96 pages.

Mettler, Bernard et al.; "System Identification of Small-Size Unmanned Helicopter Dynamics"; the American Helicopter Society, Inc.; 1999; 12 pages.

Dorobantu, Andrei et al.; "System Identification for Small, Low-Cost, Fixed-Wing Unmanned Aircraft"; Journal of Aircraft, vol. 50; No. 4 (2013); 32 pages.

Tang, Shuai et al.; "Platform and State Estimation Design of a Small-Scale UAV Helicopter System"; International Journal of Aerospace Engineering; vol. 2013; Article ID 524856; 14 pages.

Wescott, Tim; "Applied Control Theory for Embedded Systems"; Newnes; 2006; 321 pages.

Wescott, Tim; "Measuring Frequency Response"; Wescott Design Services; available online: https://www.wescottdesign.com/articles/FreqMeas/freq_meas.html; downloaded Sep. 7, 2018; 12 pages.

\* cited by examiner

METHOD AND SYSTEM FOR BODE PLOT INFORMATION COLLECTION FOR HOVERING/FIXED-WING UNMANNED AERIAL VEHICLES (UAVS)

TECHNICAL FIELD

The present disclosure relates to the collection of information for the creation of Bode plots for use by a hovering/fixed-wing Unmanned Aerial Vehicles (UAVs).

BACKGROUND

Bode plots can be used to judge how reliably a feedback loop is tuned. In UAVs, it is difficult to collect the information required to create a Bode plot because the UAV must be maintained in a stable attitude while a Bode plot generation input signal is applied.

A helicopter or a fixed-wing with no electronic control system can be flown by a human. A multirotor, on the other hand, must have a computerized control system as it is impossible for a human to fly one without the aid of a computerized system.

One of the main problems for creating a Bode plot for UAVs is combining the Bode plot generation input signal with appropriate control inputs to keep the system flying in a safe location. It is possible to apply the input signal to the control system while manual control is disabled but then you would have no position control. A gust of wind could push the UAV into some nearby obstacle or the UAV could become unstable.

Existing systems for helicopters and other non-multirotor aerial vehicles apply a Bode plot generation input signal directly to the controls of the system. This is not possible in multirotor vehicles as they are so unstable that they would flip over and crash if the feedback loops are not engaged. Although fixed-wing UAVs are inherently stable, applying a frequency sweep directly on the controls of the system may lead to instability and therefor a crash. Specifically, feedback loops are always required to maintain attitude control. It is possible to apply an input signal directly to the motors, but it may become unstable.

SUMMARY

In one aspect, there is provided a method for collecting information required for Bode plot creation of a UAV (Unmanned Aerial Vehicle) autopilot system, the method comprising: creating a Bode plot generation input signal: adding the Bode plot generation input signal to control inputs; collecting data from multiple points within the control system; calculating magnitude and phase at the multiple points using the data collected; recording the magnitude and phase for the multiple points in a datalog; comparing the magnitude and phase for the multiple points to calculate the gain and phase margins for open loop responses in the control system; creating a Bode plot for at least one of the following: i) a closed loop response of the attitude and/or rate loops, ii) an open loop response of the attitude and/or rate loops and iii) a response of the UAV; and outputting the Bode plot.

Throughout this document, swept sine waves are mentioned as an example for the Bode plot generation input signal. Generally, different types of excitation signals can be utilized as the Bode plot generation input signal, including, but not limited to step functions, swept sine waves and white noise.

DETAILED DESCRIPTION

Figure 1:
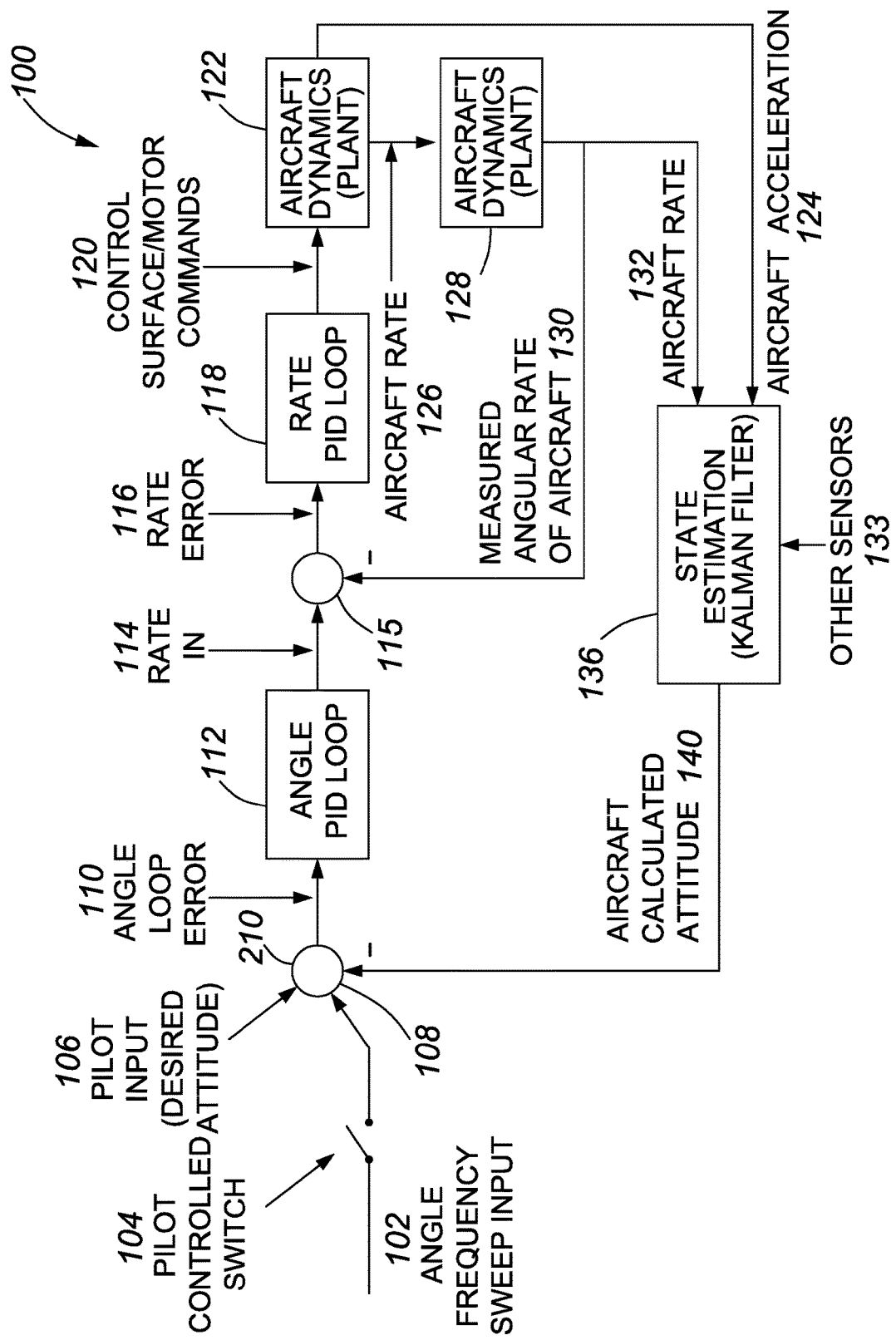
FIG. 1 is line drawing of a bode plot calculation structure in accordance with one example embodiment of the present disclosure.

To the accomplishment of the foregoing and related ends, certain illustrative aspects are described herein in connection with the following description and the annexed drawings. These aspects are indicative of the various ways in which the principles disclosed herein can be practiced. Other advantages and novel features will become apparent from the following detailed description when considered in conjunction with the drawings.

Throughout this disclosure, angular rates refer to how fast the aircraft is rotating and attitude is how the aircraft is oriented with respect to the earth reference frame. A stationary aircraft tilted on an angle has an attitude but no angular rate. An aircraft that is rotating (for example, it is rolling) has an angular rate and a changing attitude. Angular rate is the time derivative of attitude, i.e. it is possible to measure angular rate and integrate it to obtain attitude.

In one implementation, the method of the present disclosure comprises: creating an input signal; adding the input signal of varying frequency to control inputs; collecting data from multiple points within the control system; calculating magnitude and phase at the multiple points using the data collected; recording the magnitude and phase for the multiple points in a datalog; comparing the magnitude and phase for the multiple points to calculate the gain and phase margins for open loop responses in the control system; creating a Bode plot for at least one of the following: i) a closed loop response of the attitude and/or rate loops, ii) an open loop response of the attitude and/or rate loops and iii) a response of the UAV; and outputting the Bode plot.

In one embodiment, the input signal is a sinusoidal signal. In some embodiments, the input signal is a sinusoidal signal of varying frequency.

In some embodiments, the method further comprises: setting parameters for a frequency sweep; and performing the frequency sweep of the UAV's control system according to the parameters. In a non-limiting example, the parameters comprise a start frequency, an end frequency, magnitude, length of time at each frequency step, and axis.

The control inputs can be on a manual pilot or an autonomous pilot, but are not limited to these two examples.

In the method disclosed herein, a manual pilot is allowed to hold a position for a multirotor or to maintain a straight-line trajectory for a fixed-wing by controlling the vehicles pitch and roll. The pilot's input shifts the system output and input by the same amount. Practically, pilot's interference should be kept at a minimum while the Bode plot generation input is applied to the system. The pilot input command for holding a desired position can be replaced by different types of controllers, including but not limited to a position hold controller or by restricting the flight area of the UAV using a geofence. While doing this, the disclosed system superimposes Bode plot generation input signal, such as a sine wave of varying frequencies, on top of the control inputs. The sine wave is added to an attitude control loop. In some embodiments, code running within an autopilot generates a sinusoidal attitude command which is added to the pilot's attitude command. In some embodiments, there is a 'signal generator' module within the autopilot software. The attitude control loop is preferred over other loops that controls rate (i.e. pitch rate, roll rate etc.) as it is riskier to add a control input onto these other loops. If a control input is added to the pitch rate or roll rate, for example, the vehicle may not necessarily stay upright. For similar reasons, the attitude control loop is preferred over directly imposing the commands to the motors.

The magnitude components of bode plots are generated by taking an output signal magnitude and dividing it by an input signal magnitude. The phase component is generated by taking the output signal phase and subtracting the input signal phase. The division and subtraction of the input and output signals is done for specific frequencies. In one example of the disclosed method, the output signal magnitude (angular rate for example) is divided by the input (desired angular rate) to get the Bode plot for an unmanned aircraft. For example, the output signal component at 10 Hz is divided by the input signal component at 10 Hz. An open loop response of the plant and controller is calculated while operating in a closed loop fashion. This specific example will yield a closed loop response for the angular rate control loop. An open loop response is obtained by dividing the output signal by the error signal. Continuing from the closed loop rate case, the open loop rate response may be obtained by dividing the actual angular rate by the difference between the actual angular rate and the desired angular rate (i.e. Open loop rate=(Angular Rate)/(Angular Rate-Desired Angular Rate)). This method overcomes problems of other methods used to calculate open loop response which require the vehicle to be controlled in an open loop manner. However, controlling multirotor vehicles in an open loop manner is not possible due to the fact that they are inherently dynamically unstable. Likewise, controlling a fixed-winged aircraft in an open loop manner is not ideal as it may lead to instability and crash.

Referring to FIG. 1, one embodiment of a bode plot calculation structure 100 will now be described. In the structure disclosed a pilot controlled switch 104 connects an angle frequency input 102 to a first junction 108 where it is added to a desired attitude 106 input by the pilot and an aircraft calculated attitude 140. The output of the first junction 108 is an angle loop error 110 and it is input into an Angle PID (proportional-integral-derivative) Loop 112. The output of the Angle PID Loop 112 is a desired aircraft angular rate 114 and it is input into a second junction 115. A second input to the second junction 115 is the measure angular rate of the aircraft 130. The output of the second junction 115 is a rate loop error 116 which is in turn input into a Rate PID Loop 118. The Rate PID Loop outputs control surface/motor commands 120 which are input into aircraft dynamics (plant) 122. Aircraft dynamics are the mathematical models that describe a system's behaviour over time. They are different for different vehicle types and frames. These models are used to simulate the system, otherwise, if an actual system is being used, aircraft dynamics represent the behaviour of the actual system. There are two outputs from the aircraft dynamics (plant) 122: an angular rate measured by gyroscope 126 and aircraft acceleration 124. The angular rate measured by gyroscope 126 is input into a low pass filter 128, however, this filter 128 is optional. The output from the filter 128 is the measured angular rate of the aircraft 130 that is input into the second junction 115. The measured angular rate of the aircraft 130 is also input into a State Estimation Filter 136 together with the aircraft acceleration 124 and outputs from other sensors 133. Non-limiting examples of other sensors 133 are compass and GPS. An example of the State Estimation Filter is a Kalman Filter. The output from the State Estimation Filer 136 the aircraft calculated attitude 140 that is input into the first junction 108.

Using the structure 100, one embodiment of the process disclosed herein is as follows: A single axis is selected to be excited. The parameters of the Bode plot generation input signal are set into an autopilot. For a sine wave consists of discrete frequencies input, a starting point of the frequency sweep is set. An ending point of the frequency sweep is set. A time of each frequency step is set. A frequency step increment is set. The frequency sweep begins. This is a discrete frequency sweep, so at each point in time the aircraft is only excited with a single input frequency, plus whatever the pilot input is. For the duration of each frequency step, the magnitude and phase of each the follow points of the angle loop error 110, desired aircraft angular rate 114, rate loop error 116, control surface/motor commands 120, frequency sweep input 102, aircraft angular rate 130, and aircraft attitude 140 on FIG. 1 is calculated. The magnitude and phase at a single frequency (the frequency of excitation) is calculated. The magnitude and phase of each point are calculated according to equation 3,4, and 5 in the following article: http://www.wescottdesign.com/articles/FreqMeas/freq_meas.html, USA 2009, Wescott Design Services, Inc. and also described in the book written by Tim Wescott, called *Applied Control Theory for Embedded Systems*, USA Newsnes 2006 both of which are herein incorporated by reference. The magnitude and phase at each frequency step are recorded into the autopilot's on-board datalog. After the flight or during the flight, these points are downloaded and may be plotted according to what Bode plot of each loop a user wishes to see. For example, the open loop system response may be calculated by using the aircraft angular rate divided by the motor command. Non-limiting examples of the loops for which responses can be calculated are: Open Loop Rate Controller, Open Loop Plant, Open Loop Plant+controller, Open Loop Angle Controller, Closed Loop Rate, and Closed Loop Angle. The Bode plot of the Open loop plant, and Open Loop Plant+controller can be used to analyze the stability of the system and to determine what changes should be made to the Rate controller to obtain better response from the UAV system. Additionally, the Bode plot of the Open Loop Rate Controller may be used to verify the controller is working as anticipated.

In an embodiment, a method for collecting information required for Bode plot creation of a UAV autopilot system comprises a first step of adding sine waves of varying frequency to control inputs of a manual pilot using a code, so as to perform frequency sweep. Then, a frequency sweep is performed using the parameters: start frequency; end frequency; magnitude; time at each frequency; frequency step; and axis. The parameter "axis" can include roll, pitch or yaw. After the frequency sweep, data is collected from an automatic control system to calculate magnitude and phase at multiple points, the points being: input and output of each feedback loop; motor commands; error input to feedback loops; and angular rates from the attitude filter. Next, the magnitude and phase information from the different points in the system is compared and the gain and phase between the two points are calculated. Finally, a Bode plot is created for the closed loop response of the attitude and rate loops, the open loop response of the attitude and rate loops and the response of the UAV. In a preferred embodiment, magnitude and phase are calculated with respect to a reference magnitude and phase during the frequency sweep. After the sweep (i.e. not in real time), that recorded magnitude and phase are used to calculate the magnitude and phase used in the Bode plots.

In some embodiments, the sine wave is defined as follows:

$f_{start}$:=start frequency in Hz
$f_{end}$:=end frequency in Hz
$f_{step}$:=frequency step in Hz
$f_s$:=sampling frequency of system in Hz
$A_D$:=input control signal magnitude
$T_{sweep}$:=length of time at each frequency in seconds $$S_{max} := \frac{(f_{end} - f_{start})}{f_{step}}$$

$$f_{eur} := f_{start} + f_c * f_{step}, \{f_c \in \mathbb{Z} | 0 \le f_c \le S_{max}\}$$

$$k_{max} := T_{sweep} f_s$$

$$b[k, f_{eur}] = A_D * \sin(2\pi f_{eur} k), \begin{cases} \{k \in \mathbb{Z} | 0 \le k \le k_{max}\} \\ \{f_{start} \le f_{eur} \le f_{end}\} \end{cases}$$

Where $S_{max}$ is defined to be the maximum number of frequency steps required to sweep the desired input response of the system, $f_{eur}$ is defined to be the current frequency that the Bode tool is currently generating to the input of the control system, and $k_{max}$ is defined to be the maximum number of discrete signal points needed to sweep the system for the desired length of time, based off of the system signal generating rate and the desired sweep time. Whereas b[k, $f_{eur}$] is the generated bode input signal to the control system at discrete points k at the current sweep frequency $f_{eur}$.

The system consists of code that adds a sine wave of varying frequency to the control inputs of a manual pilot. In some embodiments, the code is stored on a non-transitory memory. A frequency sweep is performed using the following parameters: start frequency; end frequency; magnitude; time at each frequency; frequency step; and axis. Data, such as angular rate, desired angular rate, angular rate error, etc. is obtained from the autopilot's control system at a variety of points. This data allows the calculation of magnitude and phase. The points collected are: input to each feedback loop; output of each feedback loop; motor commands; error input to feedback loops; and angular rates from the attitude filter as well as the attitude. Analysis is performed by the system that compares the magnitude and phase information from the different points in the system and allows the calculation of a gain and phase between the points.

Figure 2:
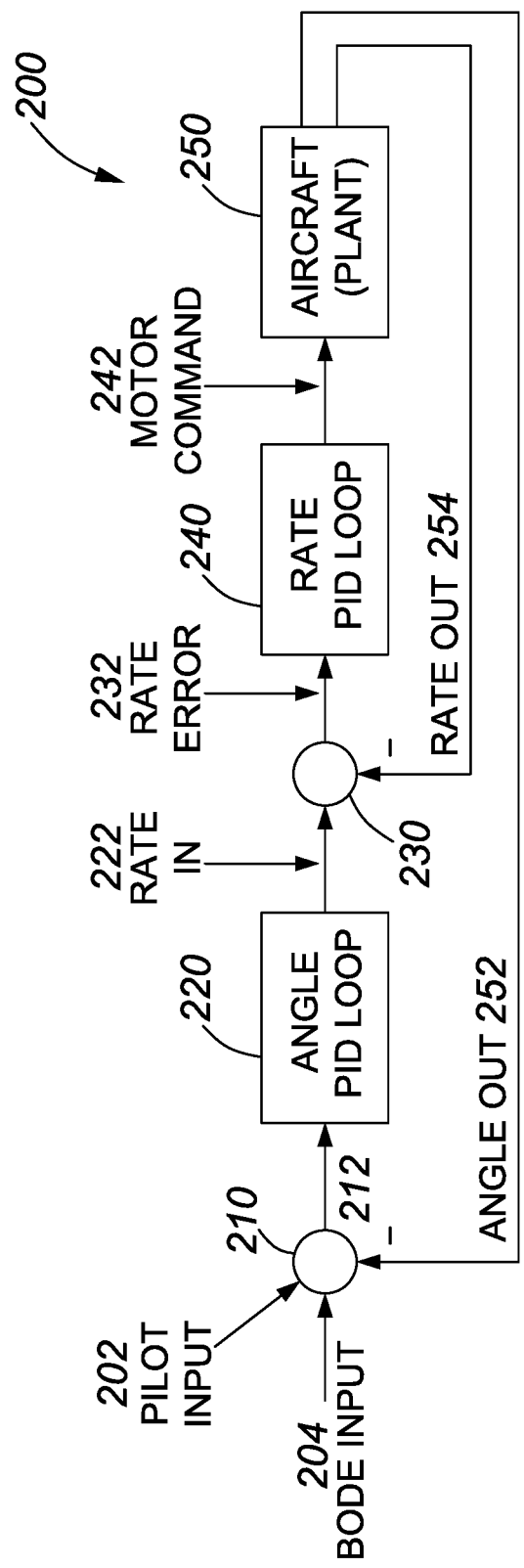
FIG. 2 is line drawing of a bode plot calculation structure in accordance with one example embodiment of the present disclosure.
Figure 3:
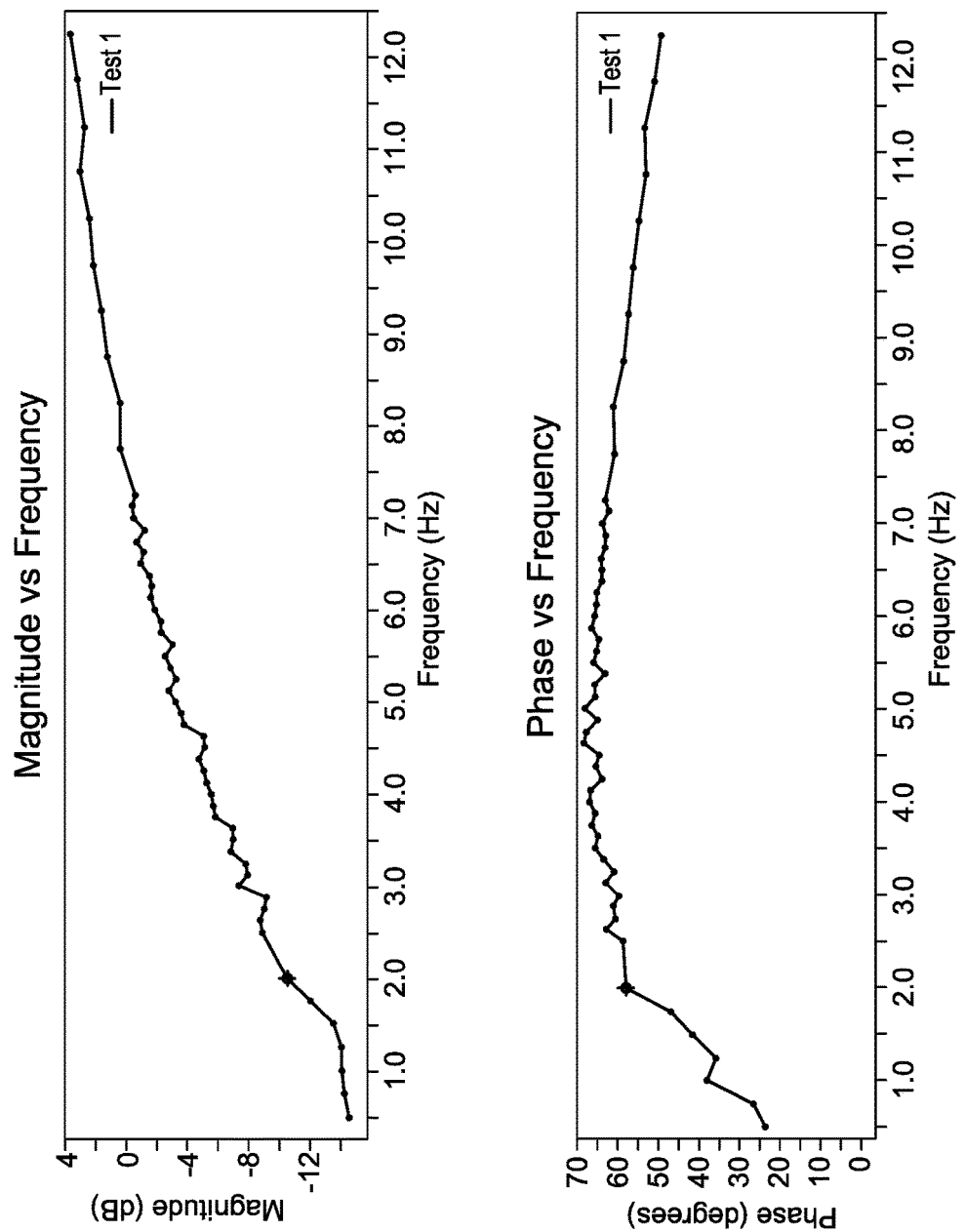
FIG. 3 is a graph of a controller Bode response according to one example embodiment of the present disclosure.
Figure 4:
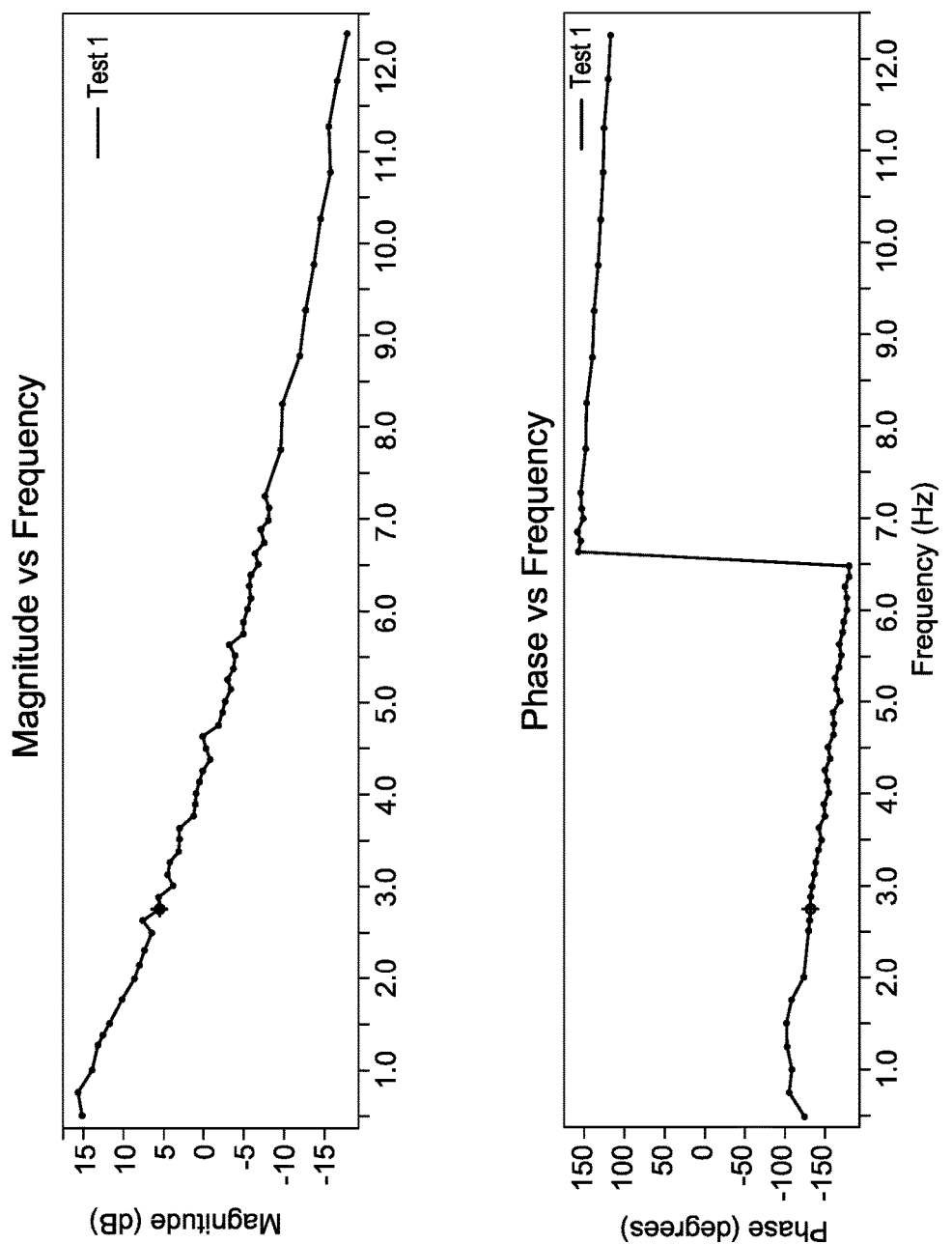
FIG. 4 is a graph of a plant Bode response according to one example embodiment of the present disclosure.
Figure 5:
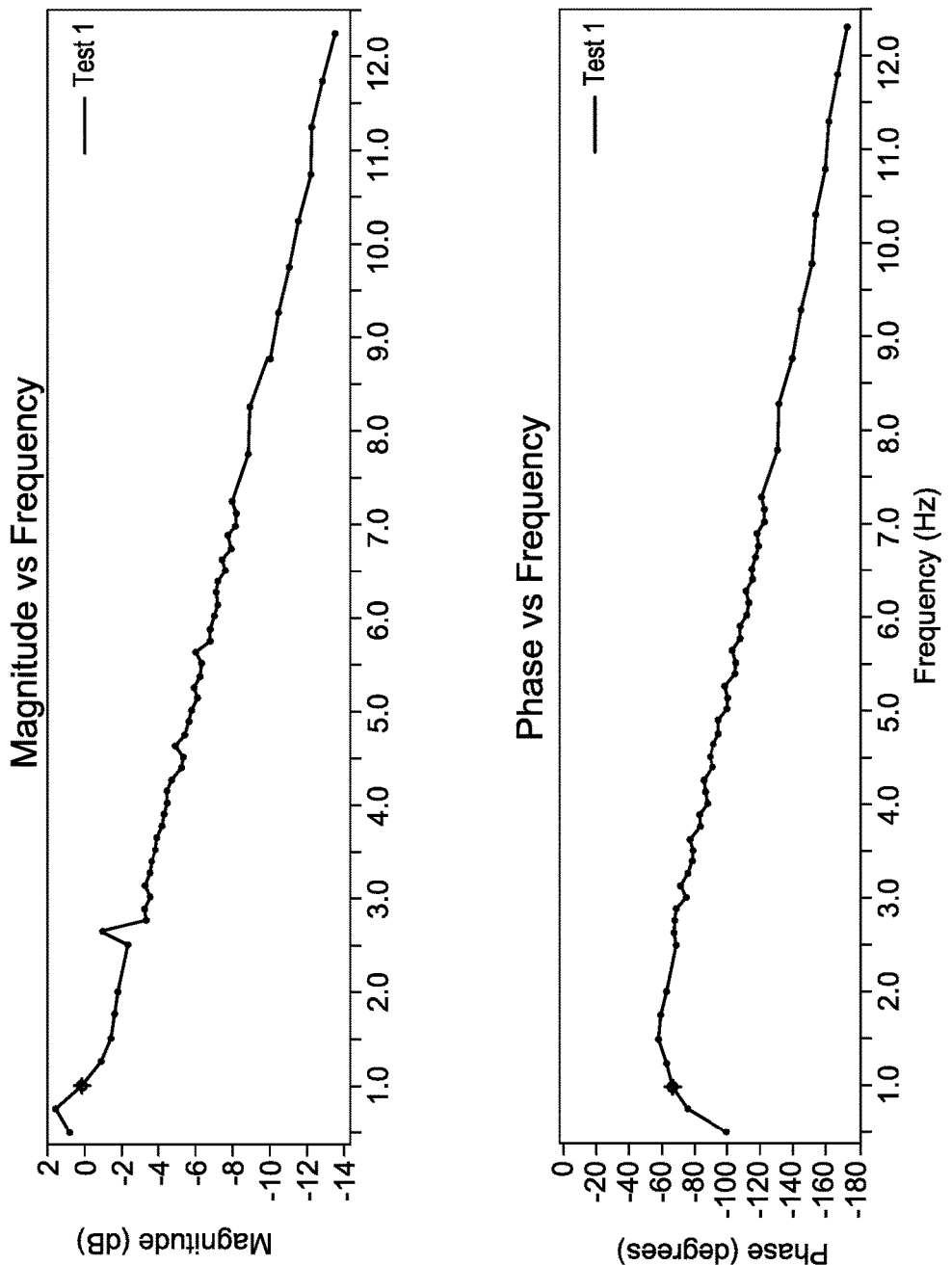
FIG. 5 is a graph of an open loop and controller Bode response according to one example embodiment of the present disclosure.
Figure 6:
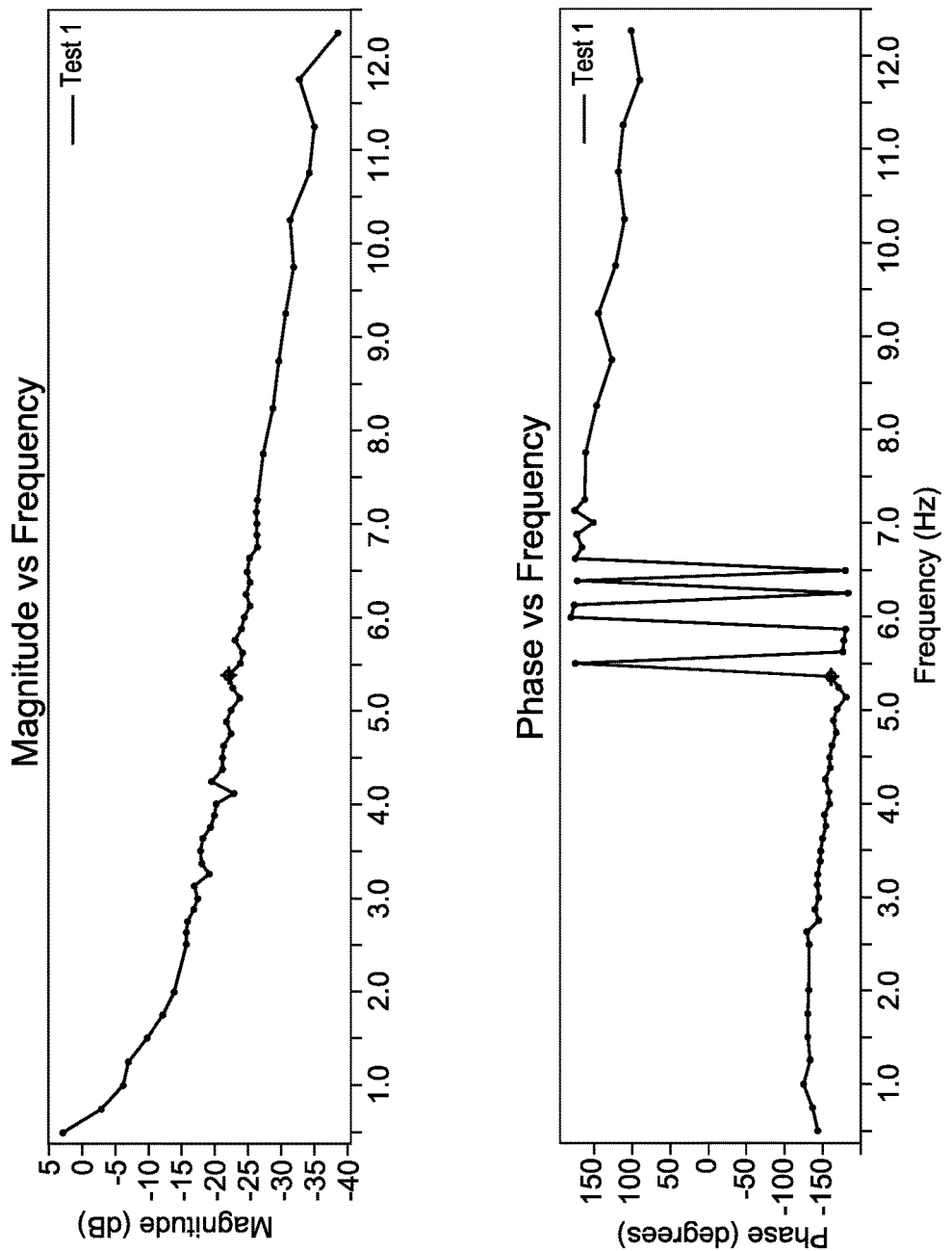
FIG. 6 is a graph of an open loop angle Bode response according to one example embodiment of the present disclosure.
Figure 7:
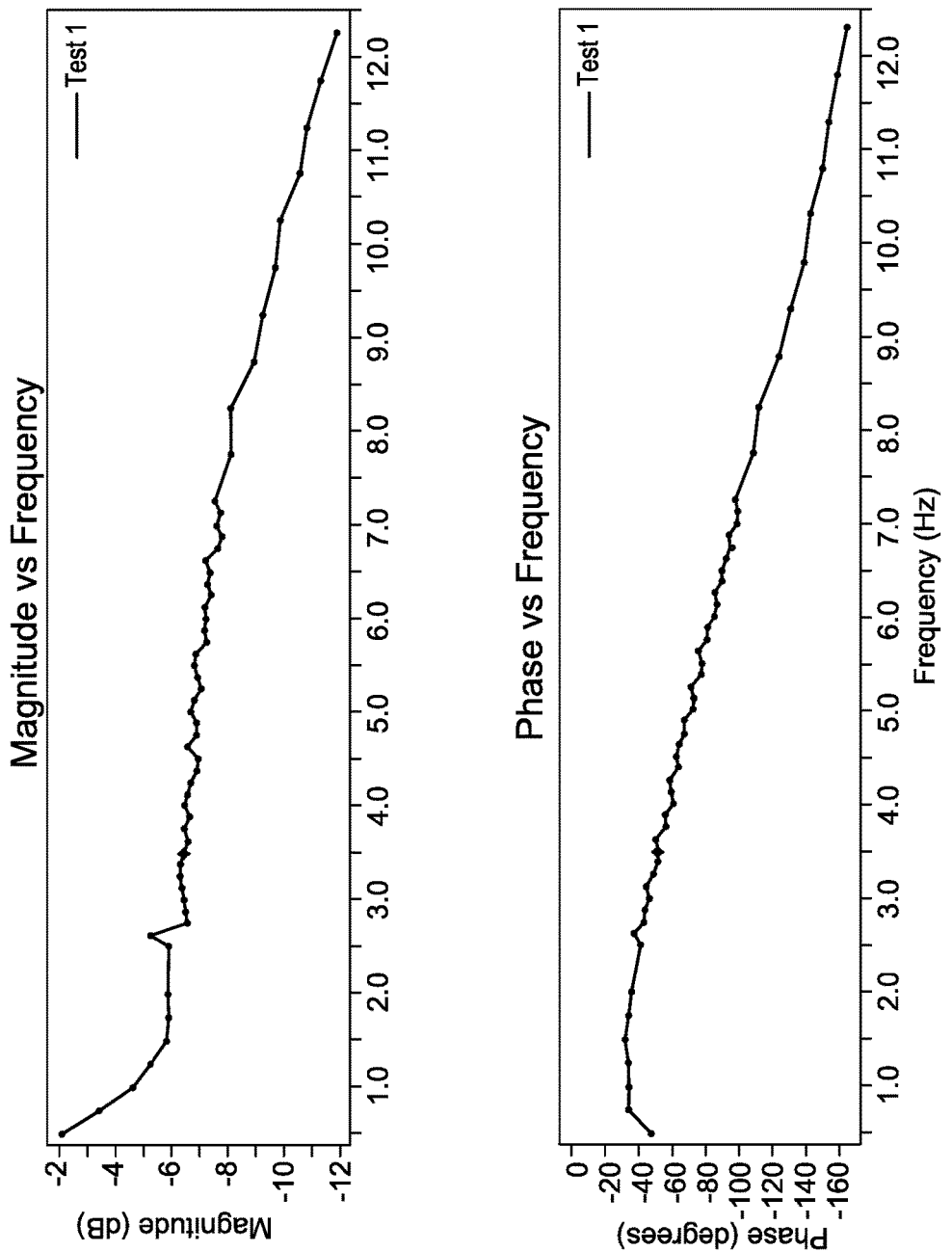
FIG. 7 is a graph of a closed loop rate Bode response according to one example embodiment of the present disclosure.
Figure 8:
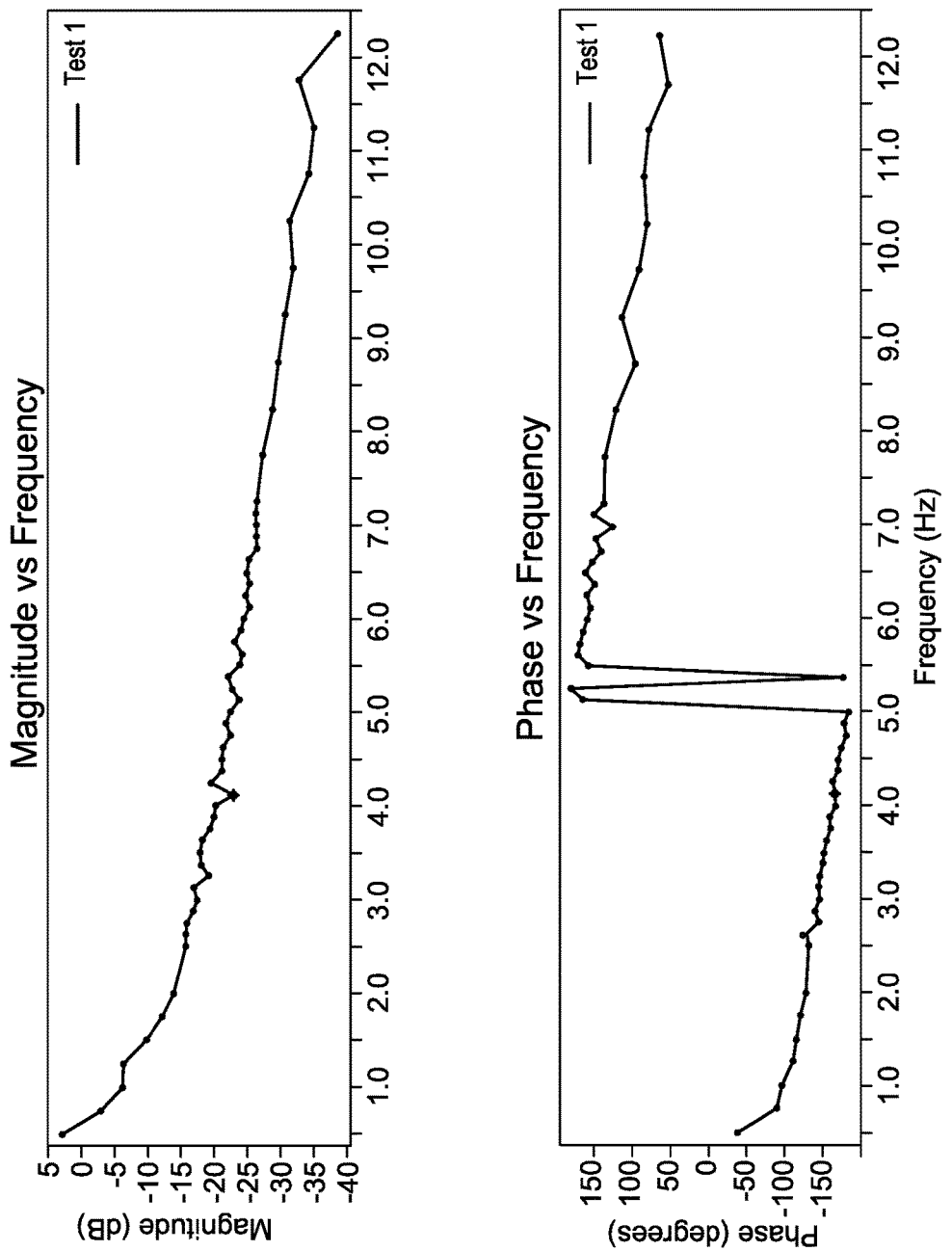
FIG. 8 is a graph of a closed loop angle Bode response according to one example embodiment of the present disclosure.

The frequency response of the system is calculated by applying a sine wave with a desired frequency to the system while monitoring and recording the system outputs. The input sine wave, Bode Input, is added to the desired angle, Pilot Input, as shown in FIG. 2. In the system shown in FIG. 2, pilot input 202, bode input 204 and Angle Out 252 are input into a first junction 210. The bode input 204 is a sine wave. The output 212 from the first junction 210 is input into an Angle PID loop 220, which outputs Rate In 222. Rate In 222 is input into a second junction 230 along with Rate Out 254. The output from the second junction 230 is Rate Error 232 and it is input into a Rate PID Loop 240. The output from the Rate PID Loop 240 is Motor Command 242 and it is input into an Aircraft (plant) loop 250. There are two outputs from the Aircraft (plant) Loop: Rate Out 254 and Angle Out 252.

Considering the fact that the sine wave is applied to the input of the control system, the stability of the system throughout the Bode plot flight can be promised. Additionally, the pilot is still able to safely control the aircraft in case of emergency. The pilot may also exit the frequency sweep at any time by means of a manual switch (not shown in FIG. 2). Upon returning to the frequency sweep mode, the frequency sweep will automatically restart at the point it was exited.

The inner loop, angular rate loop, and the outer loop, angle loop, can be run at different frequencies. In some embodiments, the maximum frequency for the angle loop is 180 Hz, and the maximum frequency for the rate loop is 400 Hz. Based on the Nyquist theorem the maximum frequency in the Bode plot cannot be more than half of the sampling frequency. For instance, if the Unmanned Arial Vehicle is controlled by running the angle and the rate loops both at the frequency equal to 120 Hz, the maximum frequency in the Bode plot cannot be bigger than 60 Hz. If a wider frequency range is desired, you would sample at a higher frequency.

The outputs are recorded at several points of the control system, namely, Rate In, Rate Error, Motor Command for multirotor vehicles, Servo Command for fixed wing aircraft or helicopters, Rate Out, Angle In, Angle Out, and Angle Error. After performing the Bode plot flight and recording the required data, the user is able to plot the open-loop, closed-loop and plant Bode plots for both angle and rate of angle loops using the recorded data.

Bode Plot Input Generation

In some embodiments, a Bode plot signal generation tool is responsible for creating and applying the desired sinusoidal input to the system. The generated signal can be applied to each of the three axes of rotation. The tool starts from the singalGenFreq1 and increases the frequency by signalGenIncrement step by step until it reaches the singalGenFreq2. The tool keeps generating the signal at each frequency for signalGenCyclesPerFreq seconds. singalGenFreq1, singalGenFreq2, signalGenIncrement and signalGenCyclesPer- Freq are set by the user. The generated signal at each frequency and for each sample is calculated using the following formula:

$$(k) = A_D \sin(2\pi f k)$$

Where k is the sample index, $A_D$ is signalGenMagnitude and is set by the user and f (in cycles per sample) is the frequency of the current step.

Bode Plot Output Calculation—Autopilot

Assuming the stability and linearity of the plant, the output of the system at each point is in the following form:

$$y(k) = A_D A(f) \sin(2\pi f k + \phi(f))$$

Where $A(f)$ and $\phi(f)$ are the magnitude and phase of the output signal at a frequency equal to f. To find the values of $A(f)$ and $\phi(f)$ the first term of Fourier series for y should be calculated over a finite number of samples at each frequency:

$$A_I(f) = \frac{2}{N} \sum_{k=0}^{N-1} y(k) \sin(2\pi f k)$$

$$A_R(f) = -\frac{2}{N} \sum_{k=0}^{N-1} y(k) \cos(2\pi f k)$$

The above Fourier transform equations convert the time domain representation of data at each point of the control system to frequency domain representation necessary for Bode plot generation.

Where N is the number of samples at each frequency. The magnitude and phase at each frequency can be calculated using the following formulas:

$$A = \frac{\sqrt{A_I^2 + A_R^2}}{A_D}$$

$$\phi = \begin{cases} \tan^{-1}\left(\frac{A_I}{A_R}\right) & A_R \geq 0 \\ \tan^{-1}\left(\frac{A_I}{A_R}\right) + 180° & A_R < 0 \end{cases}$$

The magnitude and phase of each of the output points mentioned earlier are calculated and recorded by the autopilot during the flight. The magnitude and phase of each of the output points are saved in the fields mentioned in the following table:

|  | Magnitude (A) | Phase ($\phi$) |
| --- | --- | --- |
| Angle Error | signalGenTransferMagAngleErr | signalGenTransferPhaseAngleErr |
| Rate in | signalGenTransferMagRateIn | signalGenTransferPhaseRateIn |
| Rate Error | signalGenTransferMagRateErr | signalGenTransferPhaseRateErr |
| Motor Command | signalGenTransferMagMotor | signalGenTransferPhaseMotor |
| Angle Out | signalGenTransferMagAngle | signalGenTransferPhaseAngle |
| Rate Out | signalGenTransferMagRateOut | signalGenTransferPhaseRateOut |

Bode Plot Output Calculation—Datalog Viewer

By recording the magnitude and phase of the system at several points during the flight, the frequency response of several subsystems can be calculated at the post-flight stage using an example Datalog Viewer. The frequency response of a subsystem between two points, i and o, can be calculated as follows:

$$A_{subsystem} = \frac{A_o}{A_i}$$

$$\phi_{subsystem} = \phi_o - \phi_i$$

For instance, the Bode plot of the open-loop rate loop can be calculated using to the following formula:

$$A_{open-loop,rate} = \frac{signalGenTransferMagRateOut}{signalGenTransferMagRateErr}$$

$$\phi_{open-loop,rate} = signalGenTransferPhaseRateOut - signalGenTransferPhaseRateErr$$

Similarly, the closed-loop, open-loop and the plant Bode plots can be calculated for both the angle and the rate loops.

Log Bode Plot Extraction

The datalog viewer extracts and calculates Bode response data automatically from recorded datalogs post-flight, if the necessary data fields were recorded during flight. The datalog viewer will automatically extract phase margin, gain margin, individual Bode tests, starting time and end time by analyzing information that was recorded during flight while performing frequency sweeps with the Bode tool.

Phase margins are only extracted for open loop system responses. The phase margin is extracted automatically by searching for a 0 dB crossing in the magnitude data of the transfer function. At this 0 dB crossing, the difference from the current phase to 180 degrees is recorded as the phase margin.

Gain margins are only extracted for open loop system responses. The gain margin is extracted automatically by searching for a 180-degree phase rollover and calculating the difference in gain of the system from 0 dB.

Generated Bode Responses

Bode responses for the UAV control system that are generated on the autopilot are automatically extracted and displayed in the datalog viewer. In an example embodiment of the Bode tool disclosed herein, there are six control system responses that are calculated. The six control system responses measured are the controller, plant, open loop plant and controller, open loop angle, closed loop rate and closed loop angle Bode responses. Bode plots can also be extracted in flight. The Status Monitor tool can read fields used to generate Bode plots, assuming the test on the frequency of interest has already been performed.

Control System Response Description

The following calculations are used when calculating and displaying Bode response data:

$$\text{magnitude(dB)} = 20 * \log 10\left(\frac{magOutput}{magInput}\right)$$

$$\text{phase(degrees)} = phaseOutput - phaseInput$$

The following section will reference FIG. 1 in order to explain which input/output signals are associated to the named control responses.
Open Loot Rate Controller Response
Input Signal: Rat Loop Error
Output Signal: Motor Command
Plant Response
Input Signal: Motor Command
Output Signal: Rate Out
Open Loop Plant and Rate Controller system at a set of discrete frequencies. The tool calculates the magnitude and phase of the response at each discrete frequency and records it in the datalog. The information from the datalog can then be extracted to form a Bode plot, which is used to analyse the stability of the closed loop system.

The Bode plot tool will sweep the UAV through a programmed set of frequencies. If the system is close to instability, it is highly likely that there will be a resonant frequency at which the magnitude of the output response is greater than the commanded value. Depending on how close to instability the UAV is, the response may be quite violent. Thus, the tool should be used with caution and users should be ready to exit the Bode tool at any time during the test.

Bode Tool Fields

| Field Name | Field Number | Unit | Description |
|---|---|---|---|
| signalGenTrigger | 2486 | 0 = Don't trigger sweep<br>1 = Trigger sweep | Trigger for starting Bode plot frequency sweep. |
| signalGenTime | 2487 | Seconds * 1024000 | Internal Counter for generating sine wave |
| signalGenTransferFreq | 2488 | Hz * 1024 | Frequency of most recent magnitude/phase calculation |
| signalGenTransferMagAngle | 2489 | gain * 1024 | Most recent magnitude calculation of angle loop |
| signalGenTransferPhaseAngle | 2490 | Rad * 1024 | Most recent phase calculation of angle loop |
| signalGenType | 2491 | None - bitfield | Bit field to determine axis and recording mode<br>0x00 = Signal Gen Disabled Bits 0:1<br>0b01 = Angle responses<br>0b10 = Rate response<br>Bits 2:4<br>0b001 = Pitch Axis<br>0b010 = Roll axis<br>0b100 = Yaw axis<br>E.g. 0b010_10 = 0xB = 0d11 = Angle + rate Bode plot of roll axis. |
| signalGenFreq1 | 2492 | Hz * 1024 | Start frequency of test |
| signalGenFreq2 | 2493 | Hz * 1024 | End frequency of test |
| signalGenIncrement | 2494 | Hz * 1024 | Frequency step increment |
| signalGenCyclesPerFreq | 2495 | seconds | Time (in seconds) to spend on each frequency |
| signalGenMagnitude | 2496 | Rad * 1024 | Magnitude of signal used in frequency sweep |
| signalGenTransferMagRateOut | 2502 | gain * 1024 | Most recent magnitude calculation of rate output |
| signalGenTransferPhaseRateOut | 2503 | Rad * 1024 | Most recent phase calculation of rate output |
| signalGenTransferMagRateIn | 2508 | gain * 1024 | Most Recent magnitude calculation of rate input |
| signalGenTransferPhaseRateIn | 2509 | Rad * 1024 | Most recent phase calculation of rate input |
| signalGenTransferMagMotor | 2510 | gain * 1024 | Most recent magnitude calculation of motor command |
| signalGenTransferPhaseMotor | 2511 | Rad * 1024 | Most recent phase calculation of motor command |
| signalGenTransferMagAngleErr | 2512 | gain * 1024 | Most recent magnitude calculation of angle error |
| signalGenTransferPhaseAngleErr | 2513 | Rad * 1024 | Most recent phase calculation of angle error |
| signalGenTransferMagRateErr | 2514 | gain * 1024 | Most recent magnitude calculation of rate error |
| signalGenTransferPhaseRateErr | 2515 | Rad * 1024 | Most recent phase calculation of rate error |

Input Signal: Rate Error
Output Signal: Rate Out
Open Loop Angle
Input Signal: Angle Error
Output Signal: Angle Out
Closed Loop Rate
Input Signal: Rate In
Output Signal: Rate Out
Closed Loop Angle
Input Signal: Bode Input
Output Signal: Angle Out Sample Bode Responses The graphs in FIGS. 3 to 8 show a sample of the extracted control system response information generated by a Bode tool according to the present disclosure.

Description of an Example Embodiment of a Bode Plot Tool According to the Present Disclosure.

A Bode plot tool according to the present disclosure allows a UAV user to generate a frequency sweep of their System Configuration
UAV Flight Condition The UAV must be in a flyable condition in attitude arcade at a bare minimum. The UAV should not exhibit any oscillations if at all possible. Any oscillations in hovering flight will be amplified by the Bode test which may cause a crash. If oscillations during hovering flight cannot be removed, exercise extreme caution when using the Bode tool.

Aircraft Configuration File

Activate Bode Arcade: The channel 5 switch mode must be configured to Bode arcade mode. The arcade mode is set in the Other tab of MicroPilot's VRS editor. Channel 5 switch type: CIC position: Bode Plot Attitude Arcade Mode (RC) PIC position: Attitude Arcade Mode (RC)

Disable multirotor/fixed-wing angular rate limit: For safety reasons, the multirotor/fixed-wing angular rate limit must be disabled (set to zero) for the Bode plot test. Many UAV configuration files have angular rate limits set to detect motor failures. During the frequency sweep, the resonant frequency may amplify the commanded rate by 6-10 dB, which can cause false positive failure detections. UAV angular rate limit (deg/s): 0; Maximum lean angle (deg):55.

Add fields to the datalog: The magnitude of the response, thFe phase of the response, and the frequency of the measurement must all be added to the datalog. Add the fields from the table below to the log.

| | |
|---|---|
| signalGenTransferFreq | 2488 |
| signalGenTransferMagAngle | 2489 |
| signalGenTransferPhaseAngle | 2490 |
| signalGenTransferMagRateOut | 2502 |
| signalGenTransferPhaseRateOut | 2503 |
| signalGenTransferMagRateIn | 2508 |
| signalGenTransferPhaseRateIn | 2509 |
| signalGenTransferMagMotor | 2510 |
| signalGenTransferPhaseMotor | 2511 |
| signalGenTransferMagAngleErr | 2512 |
| signalGenTransferPhaseAngleErr | 2513 |
| signalGenTransferMagRateErr | 2514 |
| signalGenTransferPhaseRateErr | 2515 |

The datalog must be set to record at 30 Hz and custom fields must be enabled. It is a recommended to also set the datalog to not erase unless downloaded to prevent flight data from being lost on a power cycle. Avoid using the first 4 fields as they may be overwritten if status monitor is used to view PID (proportional-integral-derivative) loops during the flight.

File Configuration: For convenience, a fly file can be used to set the appropriate fields in the autopilot to begin the Bode plot test sequence. An example is shown below.

Imperial
[signalGenType]=11
//SignalGenType bitfield—
//bits 1:0—0b01=angle only, 0b10+rater response only, 0b11=rate+angle response
//Bits 4:2—0b001=pitch, 0b10=roll, 0b100=yaw
//11=8+2+1→Roll Bode test calculated rate+angle response
//Magnitude of the Bode sweep (in degrees)
[signalGenMagnitude]=7//Turn arcade mode on
[1432]=1//Rest of fly file waits and repeats
wait 100
repeat-1
fixed
definepattern 0 [signalGenFreq1]=512
[signalGenFreq2]=1024//First pattern button in horizon//
    Start frequency, in Hz*1024//End frequency of test, in Hz*1024 Increment of frequency steps, in Hz*1024
[signalGenIncrement]=256
[signalGenCyclesPerFreq]=4//time to spend at each frequency step
signalGenTrigger]=1//Set trigger 1 to start sequence
return
The above fly file will set the magnitude and type on initialization. The patterns are then used to set the frequency, frequency step, and duration of each test, and then trigger the test to begin.

Joystick Plugin: If you are using the joystick plugin, the Bode arcade mode can be activated by setting the field. [arcadeConfigJoystick, 2368] equal to 8200.

Flights in Bode Attitude Arcade

Bode Attitude Arcade

Bode attitude arcade is used to apply a frequency sweep according to the parameters set in the Bode sweep fields. The transmitter controls desired pitch, roll and yaw, the exact same as normal attitude arcade mode. When the frequency sweep is triggered, the Bode tool superimposes a sinusoid on top of the pilot's command causing the multirotor/fixed-wing to oscillate in the selected axis. The pilot continues to have control of desired pitch, desired roll and desired heading when performing a frequency sweep in the pitch and roll axis. When performing a frequency sweep in the yaw axis, the pilot only has control over desired pitch and desired roll, yaw is under complete command of the Bode tool.

At any time, the pilot may switch back from Bode Attitude Arcade to Attitude Arcade. This will immediately stop the frequency sweep test and return the UAV to pilot control.

If the autopilot exits the Bode Attitude Arcade mode while a frequency sweep is active, the frequency sweep will resume from where it left off when Bode Attitude Arcade mode is re-entered. To abort the test, the [signalGenTrigger, 2486] must be set to zero.

It is possible to land and take off while in Bode Attitude Arcade Mode. Ensure that no frequency sweep is running when landing or taking off ([signalGenTrigger, 2486]=0).

Setting up Frequency Sweeps

Prior to triggering the frequency sweep, the desired sweep characteristics must be configured. The following parameters should be set:

| | | |
|---|---|---|
| signalGenType | 2491 | Bit field |
| signalGenFreq1 | 2492 | Starting frequency, in Hz * 1024 |
| signalGenFreq2 | 2493 | Ending frequency, in Hz * 1024 |
| signalGenIncrement | 2494 | Frequency step size, in Hz * 1024 |
| signalGenCyclesPerFre | 2495 | Time to spend at each frequency (in seconds) |
| signalGenMagnitude | 2496 | Magnitude of command to apply. (In degrees if this is set in the fly file, or in rad * 1024 if set in the sensor monitor) |

Typical configurations will have approximately 6 patterns, each of which will configure and trigger a small section of the desired frequency range. Each test typically runs for 10-30 seconds, allowing a break for the pilot in between tests of multiple frequency ranges.

The type of plot generated is determined by the field [signalGenType, 2491]. The two least significant bits (bits [1:0]) select which frequency responses the autopilot will calculate. If the lowest two bits are 0b01, only the angle loop will be calculated. If the two lowest bits are 0b10, the rate loop response will be calculated. 0b11 will calculate both the rate and angle responses. 0b00 will disable the signal generator. It is recommended to test both the rate and angle responses simultaneously, meaning the configuration will be 0b11.

Bits 2:4 of [signalGenType, 2491] set the axis of excitation. 0b001 will set pitch, 0b010 will set roll, 0b100 will set yaw. Other configurations are not permitted.

A typical frequency sweep may have a 7-degree magnitude and test the range from 0.5 Hz-12 Hz with 0.25 Hz steps and a 3 second duration. Lower frequencies tend to benefit from longer duration (between 4 and 5 seconds) so that there are more periods to analyse.

At frequencies below 0.5 Hz the UAV will tend to begin to move back and forth in the axis of the test (i.e. a roll sweep will move the UAV in the Y axis). If tests below 0.5 Hz are to be conducted, ensure that there is sufficient room in the axis of the test. The magnitude of the signal may also be reduced to limit the amount of movement of the UAV, however it is recommended to keep the same magnitude throughout the Bode sweep.

After the initial Bode test of a system, identify frequency regions of interest and decrease the [signalGenIncrement, 2494] in that region to obtain more points on the Bode plot.

Maximum Frequency

The maximum frequency in the present implementation that the Bode plot tool can generate is limited by the Nyquist rate of the fast loop. Other implementations could record the data more quickly. Practically, to generate a smooth sinusoid requires multiple points per period. A fast loop rate running at 120 Hz can generate Bode sweeps up to 60 Hz, however it is recommended to limit the Bode sweep to between 20 Hz and 30 Hz to ensure smooth sinusoid generation, running a minimum of 120 Hz fast loop rate.

Note that any frequency above 15 Hz will be aliased and not show up correctly in the datalog, however the results from the Bode magnitude and phase are still valid.

Running Frequency Sweeps

Once the frequency sweep parameters have been set, the frequency sweep is initiated by setting [signalGenTrigger, 2486]=1.

The autopilot will sweep through the frequencies according to the set parameters. After the programmed elapsed time at each step, the associated Bode plot fields will be updated with the most recently calculated magnitude and phase corresponding to the applied test frequency.

Upon completion of the sweep, [signalGenTrigger, 2486] will be reset to zero.

Aborting Frequency Sweeps

The frequency sweep can be aborted by setting [signalGenTrigger, 2486]=0, or by switching from Bode Attitude Arcade to Attitude Arcade. If the sweep is aborted by switching arcade modes, [signalGenTrigger, 2486] must be manually set to zero. If it is not, the frequency sweep will begin where the sweep was aborted.

Retrieving Data

When a datalog is downloaded, the fields will be viewable in the datalog viewer.

Viewing Data

The magnitude, phase and frequency data are stored in the datalog and can be viewed in the datalog viewer. The fields logged show the magnitude and phase of the loop at the points in FIG. 1.

In some embodiments, the closed loop rate response may be calculated by the following equation:

$$\text{magnitude(dB)} = 20 * \log 10\left(\frac{signalGenTransferMagRateOut}{signalGenTransferMagRateIn}\right)$$

$$\text{phase(degrees)} = signalGenTransferPhaseRateOut - signalGenTransferPhaseRateIn$$

Example System Plots (FIGS. 9 to 13)

The following Bode plots were taken from a 450 class quadrotor. Initial tests were intentionally unstable to show how the Bode tool can be used to identify potential issues.

Figure 9:
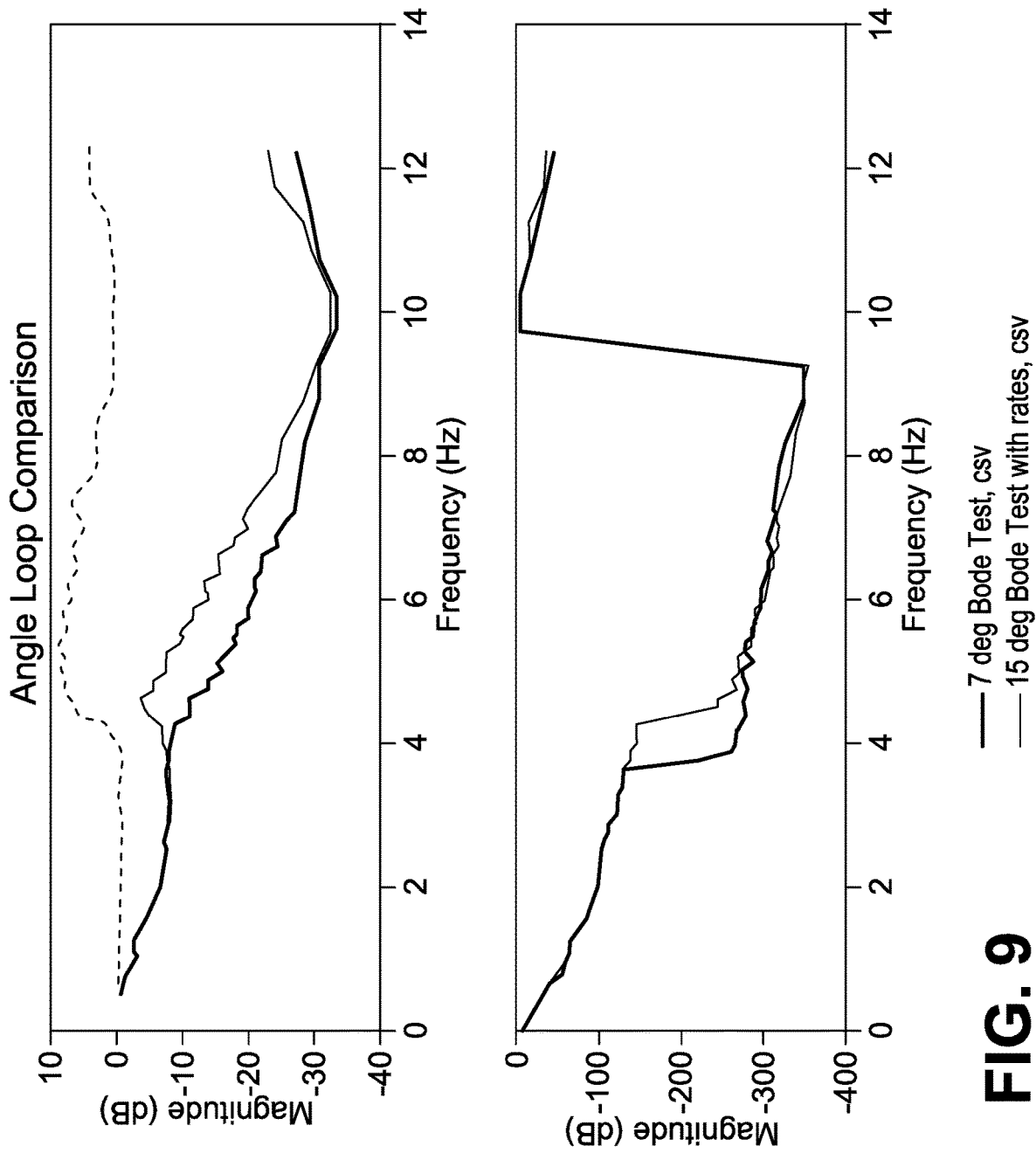
FIG. 9 is a graph showing the effect of amplitude on Bode plots according to one example embodiment of the present disclosure.

Effect of Amplitude on Bode Plots (FIG. 9)

During the initial testing, the magnitude of 15 degrees led to motor saturation. If the motors commands saturate the results from the Bode test are affected. If the motors saturate during testing, reduce the magnitude of the test signal. The dashed line in the plot of FIG. 9 shows the run to run error.

Figure 10:
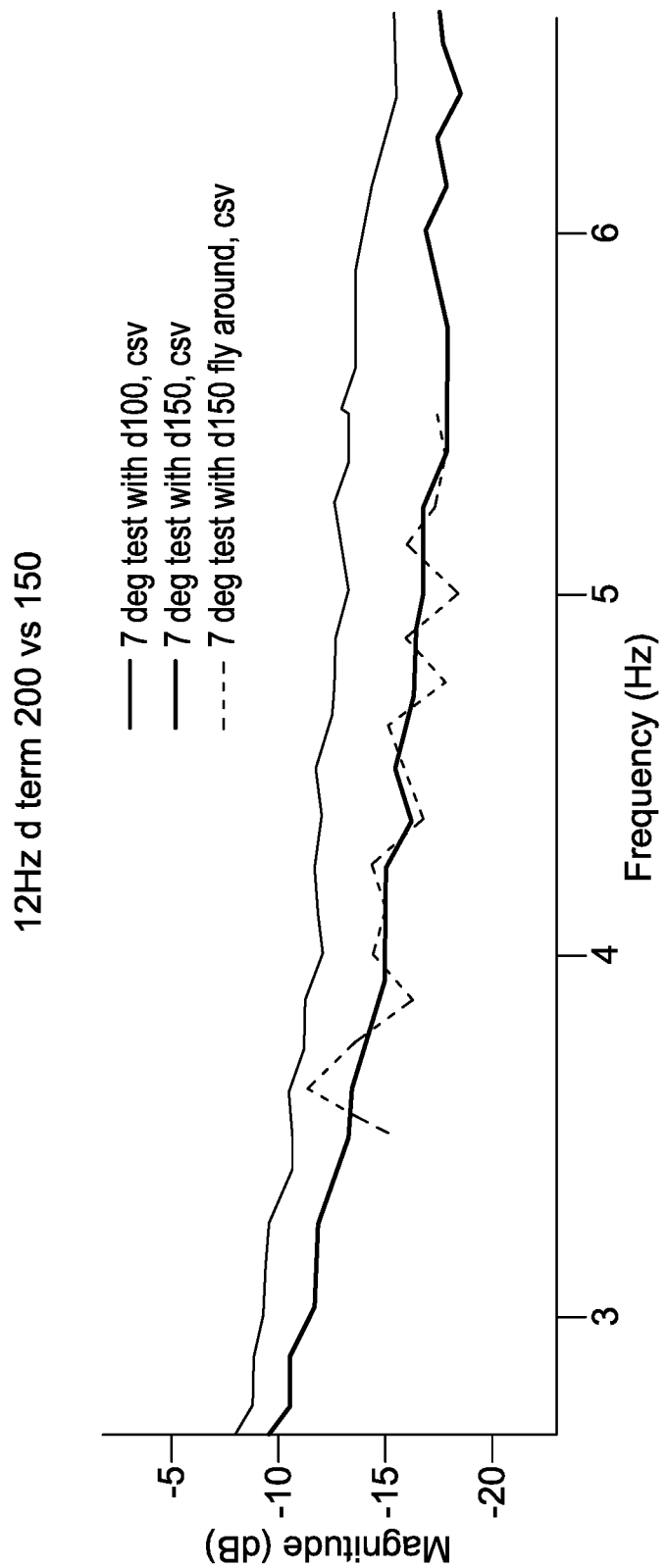
FIG. 10 is a graph showing the effect of pilot input on Bode response according to one example embodiment of the present disclosure.

Effect of Pilot Input (FIG. 10)

During all tests, attempt to keep the multirotor/fixed-wing stable and keep pilot inputs to a minimum. Pilot inputs may affect the magnitude of the Bode plot, as shown below. During this test, the quadrotor was flown in pirouetting circles while the test was performed. The plot lines should match within 1 dB, however there is typically 2 dB of error with a much higher standard deviation.

Figure 11:
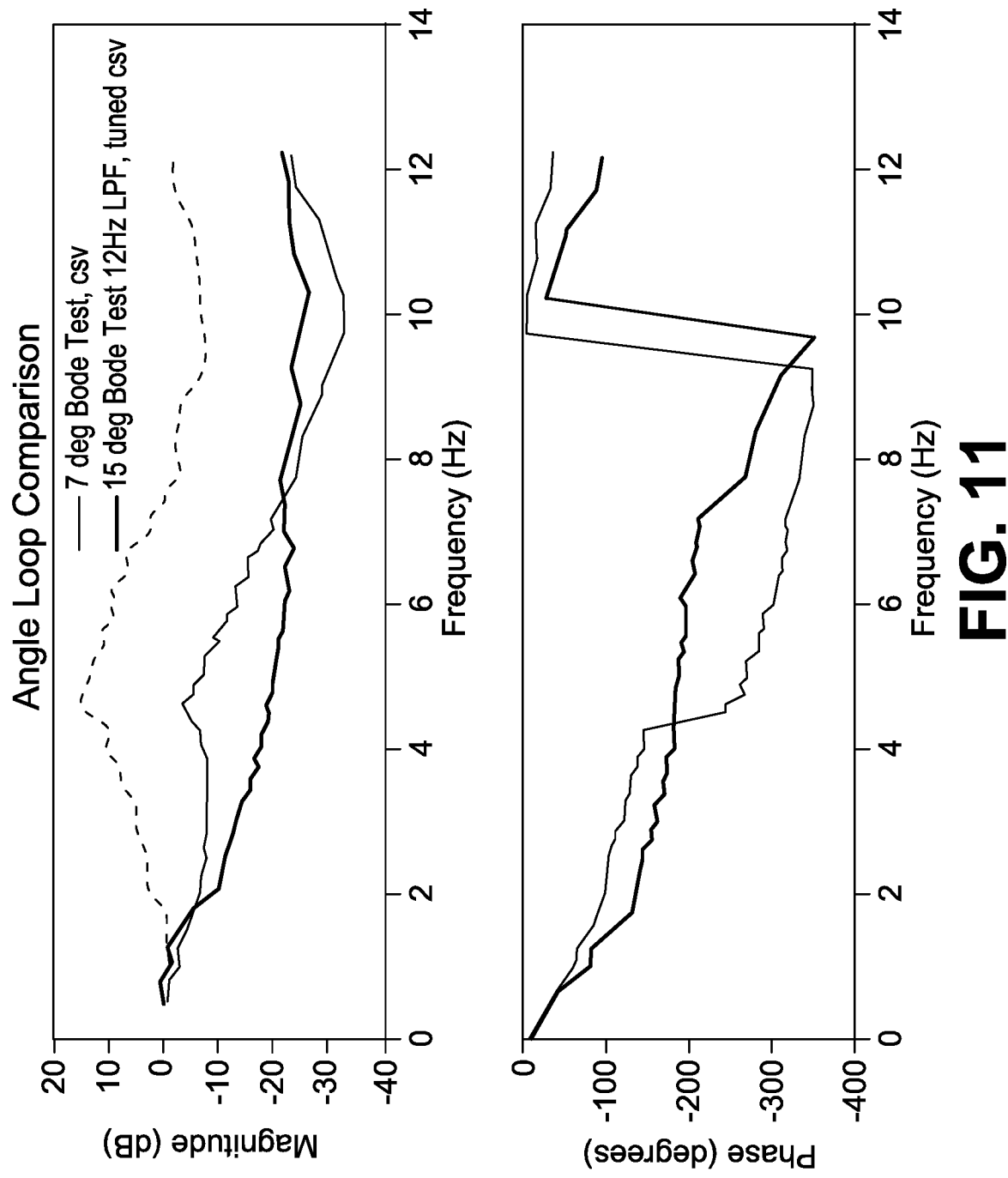
FIG. 11 is a graph showing the effect of tuning on Bode response according to one example embodiment of the present disclosure.

Tuned vs Untuned System (FIG. 11)

During the testing phase of the Bode tool the system was intentionally made marginally stable to the point where it had small inflight oscillations.

The oscillations are apparent by the small peak at approximately 4.5 Hz and the sudden drop in phase. The system was tuned by dropping the P term by 20% and increasing the D term by a factor of 4 on the aileron from roll rate loop.

Figure 12:
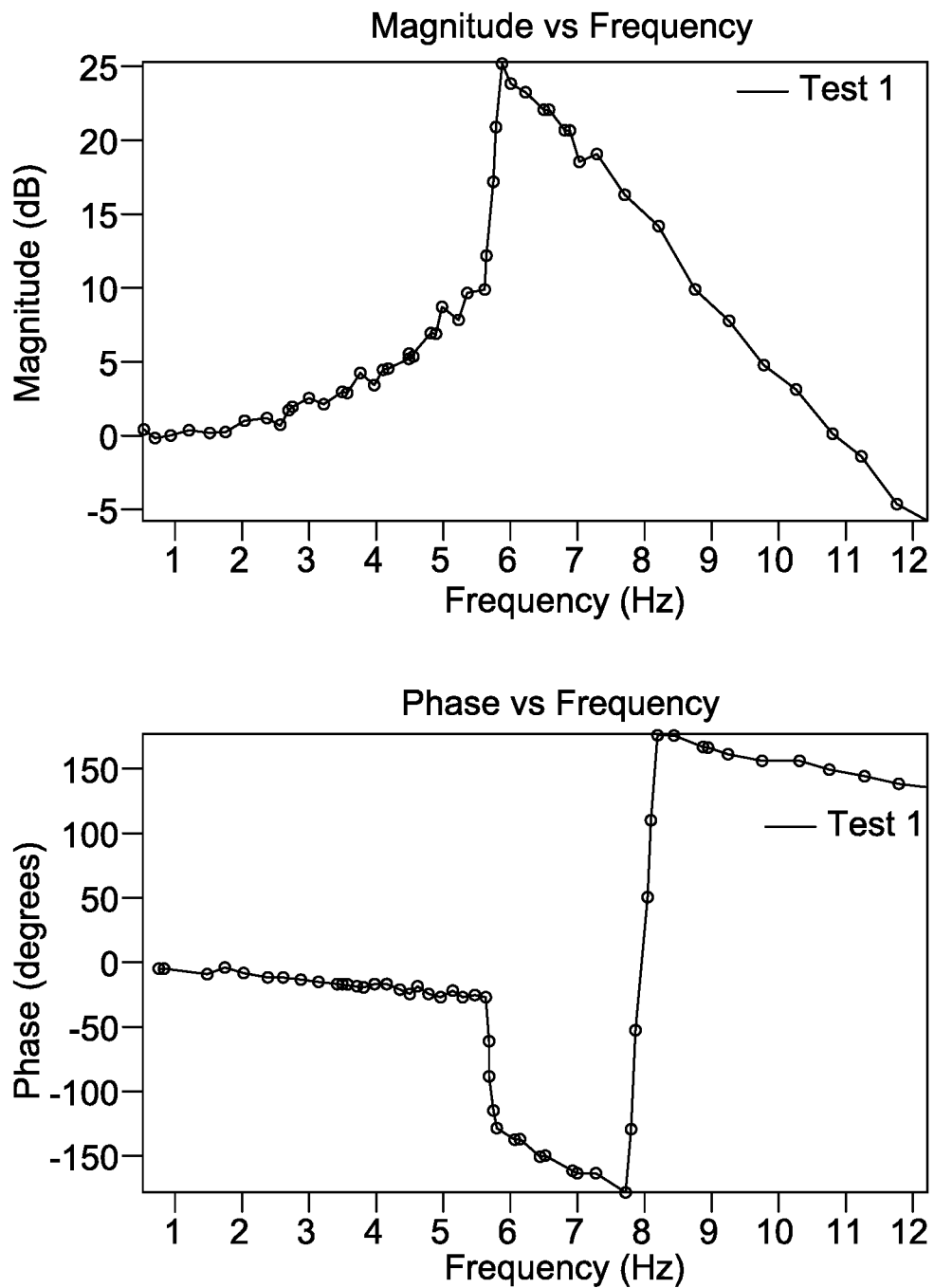
FIGS. 12 and 13 are graphs showing the effect of motor saturation on Bode response according to one example embodiment of the present disclosure.
Figure 13:
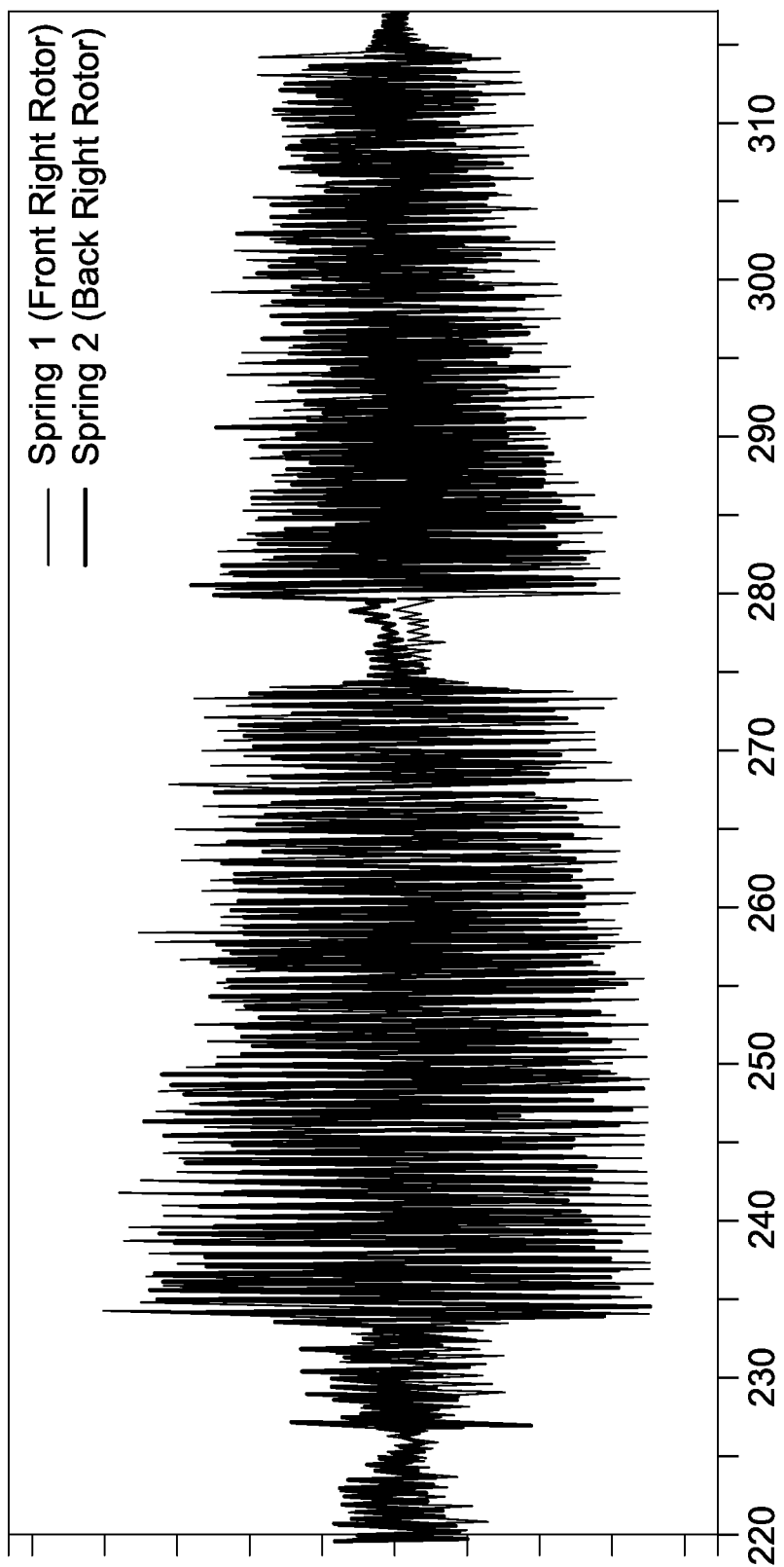

Motor Saturation (FIGS. 12 and 13)

Motor saturation is a nonlinearity that may be encountered when performing a Bode plot test. Motor saturation occurs when the rate loop output is below 10% or above 100%. This nonlinearity invalidates any portion of the Bode plot above the motor saturation point.

Careful attention should be paid to motor saturation as it is typically an indication of a PID loop that would have been unstable in the open loop, but the aircraft was able to keep flying due to the fact the motor commands were limited.

Motor saturation is apparent in flight as the multirotor will appear to shake violently before settling down to a lower magnitude, but still violent oscillation.

Motor saturation appears in the Bode plot as a large jump in phase and magnitude. In this plot shown in FIG. 12, the closed loop rate magnitude peaks at 25 dB at approximately 5.8 Hz.

Motor saturation is apparent in the datalog viewer as a motor command that appears to clip instead of appearing sinusoidal. Clipping may occur on the positive side, maxing out at +100%, or on the negative side, occurring at −81.25% (the autopilot will not command below −81.25% on multirotors to prevent ESC shutdown in flight). This is seen in FIG. 13 where motor saturation is occluding from t=234 s onwards.

Example Fly File

This fly file may be used to generate a Bode sweep with the following parameters: 0.5 Hz to 12 Hz total sweep range; 7 degree amplitude; 0.25 Hz steps from 0.5-2 Hz; 0.125 Hz steps from 2.125 Hz-7.25 Hz; 0.5 Hz steps from 7.25 Hz-12.25 Hz; and 4 seconds per step on 0.5 Hz and 0.75 Hz steps, 3 seconds on all others.

During flight, when in Bode Attitude Arcade the frequency sweeps may be generated by triggering Pattern 0-5 in sequence.

This fly file is provided for reference only and may contain values which are not suitable for every UAV. Examine the fly file closely and adjust any values to suit the UAV under test. For brevity, this fly file does not have any failure patterns which should be present on every flight with an autopilot.

imperial
[signalGenType]=11//Bode test of roll angle and rate loop.
[signalGenMagnitude]=7
[1432]=1
wait 100
repeat−1
fixed
definepattern 0

```
[signalGenFreq1]=512
[signalGenFreq2]=768
[signalGenIncrement]=256
[signalGenCyclesPerFreq]=4
[signalGenTrigger]=1
return
definepattern 1
[signalGenFreq1]=1024
[signalGenFreq2]=2048
[signalGenIncrement]=256
[signalGenCyclesPerFreq]=3
[signalGenTrigger]=1
return
definepattern 2
[signalGenFreq1]=2176
[signalGenFreq2]=3587
[signalGenIncrement]=128
[signalGenCyclesPerFreq]=3
[signalGenTrigger]=1
return
definepattern 3
[signalGenFreq1]=3587
[signalGenFreq2]=5632
[signalGenIncrement]=128
[signalGenCyclesPerFreq]=3
[signalGenTrigger]=1
return
definepattern 4
[signalGenFreq1]=5632
[signalGenFreq2]=7424
[signalGenIncrement]=128
[signalGenCyclesPerFreq]=3
[signalGenTrigger]=1
return
definepattern 5
[signalGenFreq1]=7424
[signalGenFreq2]=12544
[signalGenIncrement]=512
[signalGenCyclesPerFreq]=3
[signalGenTrigger]=1
Return
```

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations. Furthermore, to the extent that the term "includes" is used in either the detailed description or the claims, such term is intended to be inclusive in a manner similar to the term "comprising" as "comprising" is interpreted when employed as a transitional word in a claim.

The foregoing descriptions of specific embodiments of the present invention have been presented for purposes of illustration and description. They are not intended to be exhaustive or to limit the present invention to the precise forms disclosed, and obviously, many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

What is claimed is:

1. A method for stabilizing a UAV (Unmanned Aerial Vehicle) autopilot system during creation of a Bode plot, the method comprising:
    creating a Bode plot generation input signal at discrete frequencies;
    adding the Bode plot generation input signal to an input of a control loop of the UAV;
    collecting data from multiple points within the control loop of the UAV;
    calculating magnitude and phase of the control loop the UAV at the multiple points using the data collected;
    recording the magnitude and phase for the multiple points in a datalog;
    comparing the magnitude and phase for the multiple points to calculate the gain and phase margins for open loop responses in the control loop of the UAV;
    creating a Bode plot for at least one of the following: i) a closed loop response of the attitude and/or rate loops of the UAV, ii) an open loop response of the attitude and/or rate loops of the UAV and iii) a response of the UAV; and
    outputting the Bode plot.

2. The method of claim 1, wherein the input signal is a sinusoidal signal.

3. The method of claim 1, wherein the input signal is a step function or white noise.

4. The method of claim 1, wherein the input signal is a sinusoidal signal of varying frequency.

5. The method of claim 1, further comprising:
    setting parameters for a frequency sweep; and
    performing the frequency sweep of the UAV's control loop according to the parameters at the discrete frequencies.

6. The method of claim 5, wherein the parameters comprise a start frequency, an end frequency, magnitude, length of time at each frequency step, and axis.

7. The method of claim 5 wherein a maximum frequency generated by the frequency sweep does not exceed the Nyquist rate for any active control loop.

8. The method of claim 1, wherein the control inputs are on a manual pilot or an autonomous pilot.

9. The method of claim 1, wherein
    the input signal comprises a discrete series of sinusoidal signals,
    the frequency of the sinusoidal signal starts at a start frequency, and increases by a frequency step after a duration of time step at each frequency, and
    generation of the sinusoidal signal terminates when a generated sinusoidal frequency has a frequency greater than or equal to the end frequency and the magnitude of an applied command is equal to the magnitude specified in the magnitude parameter.

10. The method of claim 1, wherein the points comprise input and output of each feedback loop, motor commands, error input to feedback loops and angular rates from an attitude filter.

11. The method of claim 10, wherein the feedback loops comprise an angle loop and a rate of angle loop.

12. The method of claim 1, wherein the input signal is added to one of three axes of rotation of the UAV.

13. The method of claim 1, wherein Bode plots are created for six control loops responses: a controller, a plant, an open loop plant and controller, an open loop angle, a closed loop rate and a closed loop angle.

14. The method of claim 1, wherein the Bode plot is output to a display or a printer.

15. The method of claim 1, wherein the Bode plot is output to a datalog viewer.

16. The method of claim 1, wherein the parameters are set using a scripting language that runs on the autopilot.

17. The method of claim 1, wherein the UAV is a multi-rotor UAV.

18. The method of claim 1, wherein the UAV is a helicopter UAV.

19. The method of claim 1, wherein the UAV is a fixed-wing UAV.

20. A non-transitory computer-readable medium having computer-readable instructions stored thereon for implementing a method stabilizing a UAV (Unmanned Aerial Vehicle) autopilot system during creation of a Bode plot, the method comprising:

creating an input signal at discrete frequencies;

adding the input signal to control inputs of a control loop of the UAV;

collecting data from multiple points within the control loop;

calculating magnitude and phase of the control loop the UAV at the multiple points using the data collected;

recording the magnitude and phase for the multiple points in a datalog;

comparing the magnitude and phase for the multiple points to calculate the gain and phase margins for open loop responses in the control loop;

creating a Bode plot for at least one of the following: i) a closed loop response of the attitude and/or rate loops, ii) an open loop response of the attitude and/or rate loops and iii) a response of the UAV; and outputting the Bode plot.

* * * * *